United States Patent [19]
Clark et al.

[11] Patent Number: 5,120,230
[45] Date of Patent: Jun. 9, 1992

[54] INTERACTIVE METHOD FOR THE EFFECTIVE CONVEYANCE OF INFORMATION IN THE FORM OF VISUAL IMAGES

[75] Inventors: William E. Clark; Elizabeth R. Paxton, both of Bedminster, N.J.

[73] Assignee: Optical Data Corporation, Warren, N.J.

[21] Appl. No.: 710,233

[22] Filed: Jun. 3, 1991

Related U.S. Application Data

[63] Continuation of Ser. No. 359,048, May 30, 1989, abandoned.

[51] Int. Cl.5 .............................................. G09B 5/06
[52] U.S. Cl. .................................................. 434/307
[58] Field of Search ............... 434/307, 308, 309, 310, 434/314, 315, 316

[56] References Cited

U.S. PATENT DOCUMENTS

Re. 306.666 7/1981 Mitchell et al. ...................... 434/307
3,404,224 10/1968 Revelo et al. ........................ 434/307
4,684,349 8/1987 Ferguson et al. .................... 434/308

Primary Examiner—William H. Grieb
Attorney, Agent, or Firm—Lieberman Rudolph & Nowak

[57] ABSTRACT

An interactive method of effectively, and efficiently, conveying information which makes use of videodisc technology, along with associated printed material. Video images are stored on a videodisc, which images can be randomly accessed for display. The choice of which video images are displayed, or repeated, can be in response to the requests, or needs, of the recipient of the information.

5 Claims, 4 Drawing Sheets

INTERACTIVE METHOD FOR THE EFFECTIVE CONVEYANCE OF INFORMATION IN THE FORM OF VISUAL IMAGES

This application is a continuation of application Ser. No. 359,048, filed May 30, 1989, now abandoned.

FIELD OF THE INVENTION

This invention relates to an interactive method for the effective conveyance of information from an information source to an information repository and, more particularly, to an interactive method of instruction in which a laser videodisc and associated remote control and display hardware are utilized in an innovative video-based teaching strategy to effectively and efficiently convey knowledge and information.

BACKGROUND OF THE INVENTION

The effective and efficient conveyance of knowledge from an information source, such as a teacher, to an information repository, such as a student group or individual pupil, has been an obvious and long held objective in the educational community. Various diverse instructional methods have developed over the years in an attempt to attain this objective, from the rote learning once common in many Oriental cultures, to the question and answer "Socratorial" technique which is the fundamental basis for Western educational methods. With all such known educational methods, however, one concept is unchallenged, that is, human beings most effectively assimilate information when provided with visual images of the subject matter being conveyed.

Traditional instructional methods throughout the world have generally relied, at least initially, on the textbook, or its equivalent, to provide the student with visual images of the subject matter being taught. Standard textbooks, however, suffer from several inherent limitations. First, any visual information provided by a textbook is a two-dimensional static presentation, clearly inferior to the visual images possible with modern video technology. Secondly, with the textbook as a study vehicle, a student's assimilation of the subject matter is strictly limited by the reading ability of the particular student being taught.

Various video aids have been employed in the past to overcome traditional textbook limitations, such as the use of movies, slides, etc., as auxiliary vehicles to explain and highlight certain subject matter. Such video aids have also included television images, either via broadcast techniques, cable, or from accompanying video tape recorders. All such previously used video aids, however, lack the ability to be effectively utilized in an interactive manner to maintain student interest and creativity and also lack the ability to randomly access selected subject matter contained in the video material.

It is, therefore, a general object of the instant invention to provide an effective, and efficient, method for conveying information from an information source, to an information repository.

It is a further object of the instant invention to utilize the known advantages of visual presentation to effectively and efficiently convey information.

It is a still further object of the instant invention to utilize a video-based teaching strategy which greatly enhances the interactive nature of the information conveyance.

It is an additional object of the instant invention to provide a simple, but enormously effective, information conveyance method that virtually eliminates dependence on the traditional textbook in the teaching environment.

It is yet another general object of the instant invention to provide an inservice device for an instructor, wherein it is understood that an inservice device enhances an instructor's basic knowledge of a particular subject, which inservice device also functions as an effective teaching tool.

SUMMARY OF THE INVENTION

The instant invention is directed to an interactive method of conveying information from an information source, such as a teacher, to an information repository, such as a class of students, or an individual pupil. The inventive method employs the most effective teaching strategy known, which is the selected use of specific video images to convey information, which video images can be randomly chosen, or repeated, in response to the requests, or needs, of the student.

It is a first feature of the invention that the video images to be conveyed are stored on a video storage device, which video images can be randomly accessed, via a remote control unit, and displayed on a video monitor.

It is another feature of the invention that an oral narrative is presented, along with the display of the video images, which oral narrative is keyed to the specific image being displayed.

It is a further feature of the invention that specific video images can be selected, or repeated, in response to student requirements, thereby permitting a student/teacher interaction which is supported and enhanced by the selected video images.

It is a primary feature of the instant invention that the instructor, the student body and the video storage and display device form a trilogue wherein bi-directional information transfer between each leg of the trilogue is readily accomplished.

It is another feature of the invention that the presentation rhythm for the selected video images can be readily paced in accordance with student needs and/or the objectives of the instructor.

It is a still further feature of the invention that student activity requirements are an integral part of the video lesson, which activity requirements are supported and enhanced by the selected video images.

It is another feature of the instant invention that the stored video images include a glossary of terms being utilized in the video presentation, along with a separate reservoir of related information, which glossary and reservoir can be randomly accessed at any time during the video presentation.

The foregoing and other objects and features of the instant invention will be more fully understood from the following description of an illustrated embodiment thereof, in conjunction with the accompanying drawings.

DETAILED DESCRIPTION

Figure 1:
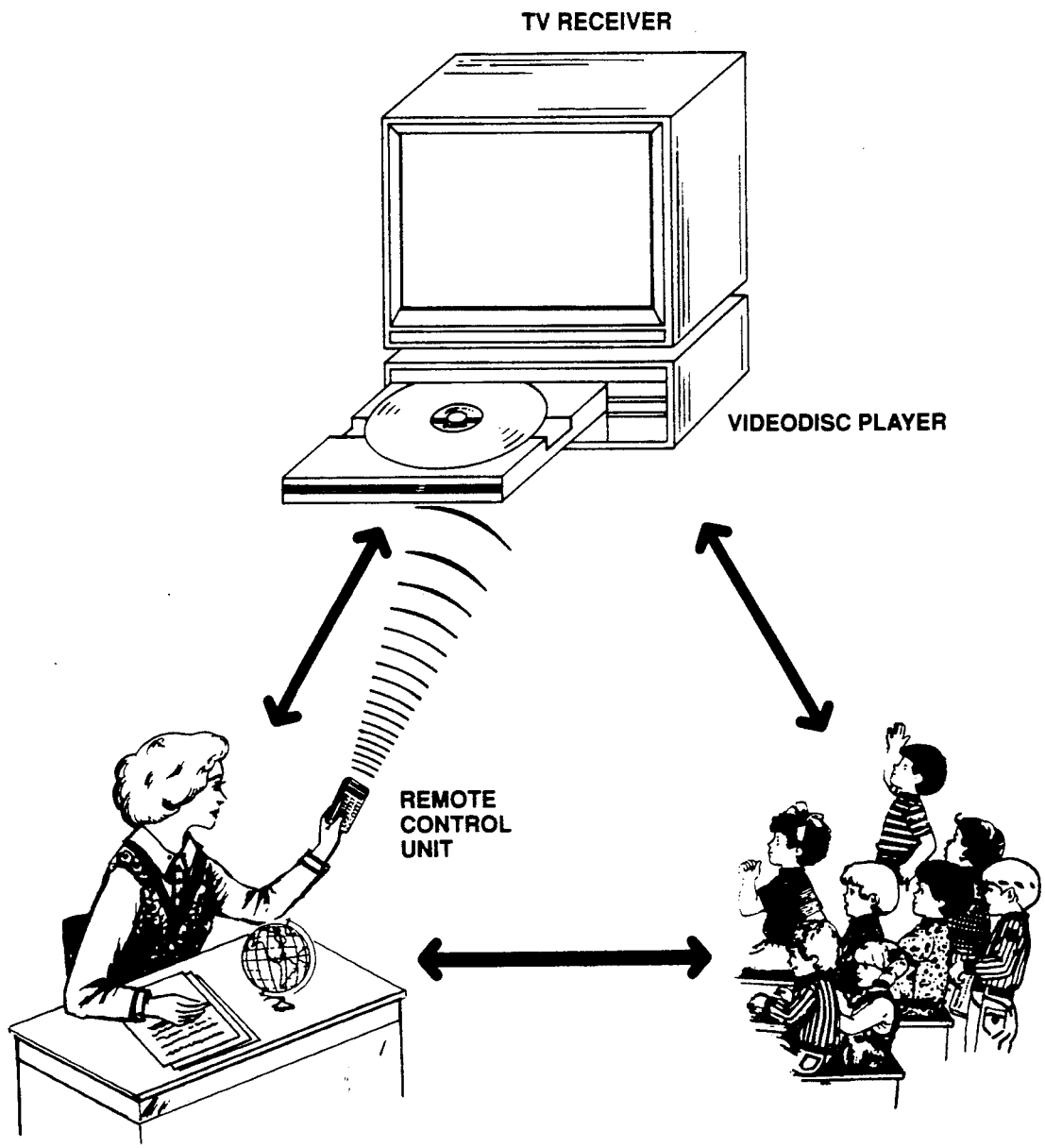
FIG. 1 illustrates an instructor, a group of students, and video storage and display apparatus all arranged in a trilogue configuration for utilization of the instant invention.

Referring now to FIG. 1, there is illustrated a generalized hardware arrangement utilized to implement the inventive, interactive method described herein for conveying information, along with an instructor and a representative body of students.

The instant invention makes use of the well documented fact that learning is best achieved through multi-sensory experiences. Thus, the inventive method simultaneously uses auditory, visual and tactile channels of learning where pictures and simple activities bring to life the information to be conveyed. Each learning objective and vocabulary term is clearly reinforced by video images and, thus, learning in accordance with the method described below is not affected by variations in standard reading levels.

The inventive method for conveying information consists generally of two teaching vehicles, a videodisc (and associated player), and printed lesson materials. A videodisc is an audio/video mass storage device, on which information is stored in the form of tiny "pits" measuring less than a micron wide. The information is stored and retrieved with a laser beam and great storage density is possible. On a typical videodisc, over 54,000 video frames can be stored, with each frame comprising a single video image. Each individual frame on the videodisc is identified with a specific frame number. Movie clips are stored by sequencing a series of video frames, along with audio information if desired. A videodisc storage device has many advantages over other video storage systems, such as video tape. Such advantages include superb picture quality, long life and, most importantly, a videodisc can be randomly accessed to selectively, and rapidly, display individual video frames, or a series of video frames. Also, videodiscs permit the use of freeze frame, step frame, or slow motion features, while maintaining high picture quality. Such videodiscs are commercially available from a number of manufacturers and, thus, no further description of videodisc technology is required for a full understanding of the invention described herein.

It is, of course, understood that any modern videodisc player could be used in accordance with the instant invention. A typical videodisc player suitable for use is the Pioneer LDV-4200 LaserDisc TM player*. Such a videodisc unit can be fully controlled by an instructor with a remote control unit as illustrated in FIG. 1. Typically, the remote control unit utilizes various commands to select and display information stored on the videodisc. Such commands include, for example, STEP, which will advance one frame forward on the videodisc player, or one frame backward on the videodisc player; MULTI, which provides the capability for forward or reverse slow motion; PLAY, utilized to start the videodisc player, or to play a movie clip; AUDIO, which sets the audio mode and may provide, for example, a left channel in English, and a right channel in a second language such as Spanish; and SEARCH, which command is utilized to search the videodisc for a particular video frame, or sequence of video frames. It is understood that individual frames may be accessed by simply inputting a frame number into the videodisc player, via the remote control unit. Also illustrated in FIG. 1 is a standard TV receiver, utilized as a video monitor for viewing of the stored video images by the student body.

*Laser Disc TM is a trademark of Pioneer Electronics Corporation.

The illustrated arrangement in FIG. 1 demonstrates an important aspect of the instant invention, which aspect is unprecedented when compared to other video-based teaching strategies. More particularly, the instructor, when utilizing the instant invention, does not simply activate a video presentation and become part of the audience. Rather, through use of the instant invention, a trilogue is formed, where trilogue is defined as a dialogue with three or more entities and, more particularly, as a three-sided arrangement having the instructor as one leg of the trilogue, the student body as a second leg, and the videodisc storage and display apparatus as a third leg. Significantly, as illustrated by the arrows between each leg of the trilogue, information transfer between the instructor, the student body and the videodisc storage and display apparatus is bidirectional and simultaneous, creating an unprecedented and innovative environment for the efficient and effective transfer of information.

Figure 2:
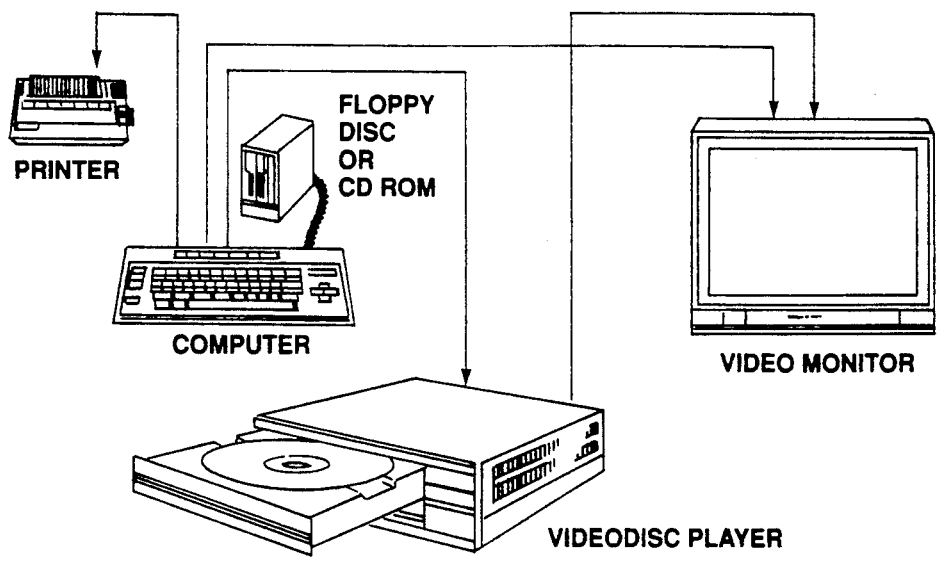
FIG. 2 illustrates a first alternative embodiment of such video storage and display apparatus.
Figure 3:
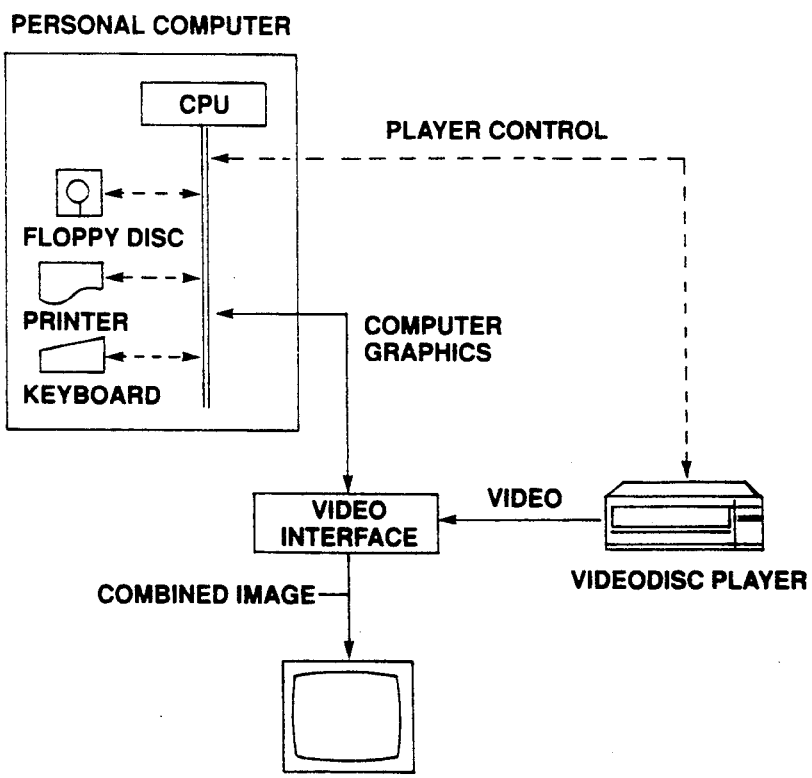
FIG. 3 illustrates a second alternative embodiment of such video storage and display apparatus.

Alternative hardware arrangements are illustrated in FIGS. 2 and 3. More particularly, in FIG. 2, the videodisc player is interfaced with a computer, a floppy disc and a printer. Such an arrangement could permit the instructor to provide selected additional features upon command which could, if necessary, be implemented by the personal computer arrangement shown.

Similarly, in FIG. 3, there is illustrated a combination of videodisc player and personal computer, to combine computer graphics information with the information stored on the videodisc. This permits the ability to combine characters and graphic images generated by the computer, with stored video images, through an appropriate interface. It is understood that any of the hardware arrangements illustrated in FIGS. 1-3 could be utilized in conjunction with the implementation of the instant invention.

The videodisc component of the interactive instructional method of the instant invention, is divided into separate Units, with each Unit being divided into three parts: a Video Lesson; Illustrated Glossary; and a Reservoir.

The Video Lesson contains pictures, diagrams, movie clips and Activities, all of which, in combination, make the topic being taught come to life with the clarity and sharpness of the visual images presented. The visual images set forth in the Video Lesson are sequential, and information to be presented is conveyed by advancing from one visual image to the next, through use of the STEP button on the remote control device. If a subsequent event is a movie, rather than a single video frame picture, the movie is shown by pressing the PLAY button. As part of the instant invention, printed narrative material is provided pertaining to the single video images, and/or the movie clips and, in addition, it is understood that accompanying audio can be provided by the videodisc itself.

The Illustrated Glossary presents, in alphabetical order, all of the vocabulary terms presented in context in the Video Lesson. An exemplary format is the presentation of each vocabulary term in five separate frames. The first frame would display the term in English, the second frame would provide a picture or diagram illustrating the term, the third frame would display a definition for the term, the fourth frame would display use of the term in a sentence, and the fifth frame would present the term in a second language, such as Spanish. It is, of course, understood that the Illustrated Glossary could also be utilized as video flash cards to introduce, or review, particular portions of a presentation.

The Reservoir is designed to contain additional photographs, diagrams, and movie clips related to the topic being presented. Such visuals provide opportunities for the expansion of the material being presented or, alternatively, provide the possibility of independent student study. Access to the Reservoir, or the Illustrated Glossary, can be accomplished at any time during presentation of the video lesson. Upon completion of the Reservoir or Glossary utilization, return to the Video Lesson is readily accomplished by selective manipulation of the remote control unit.

The printed lesson materials for use with the instant invention are divided into four parts, a Unit Planner, Video Lesson Narrative, Activity Masters, and a Print Directory.

The Unit Planner provides a Unit summary, learning objectives, a vocabulary list, and a summary of the Activities which are described below. Its purpose is to permit an instructor to integrate the video lesson quickly into previously prepared personal lesson plans. An exemplary format for the Unit Planner is a first planning page consisting of a unit summary. A second planning page would identify student learning and performance objectives, as well as vocabulary terms. A third planning page could include a list of student Activities, and a last planning page could include a Table of Contents for the comprehensive video lesson. A typical video lesson can be composed of several individual lessons, each of which would be listed in the Table of Contents.

The Video Lesson Narrative provides a fully scripted narrative interrelated to the particular video material being presented. Each paragraph in the narrative is designed to be illustrated with a picture or a movie clip on the videodisc. The purpose of the narrative is to introduce vocabulary terms, use those terms in context, present basic concepts being taught, and develop critical thinking skills for the student. If is, of course, understood that the individual presenting the material has the opportunity of reading, or paraphrasing, the narrative to the students.

A preferred arrangement for a Video Lesson Narrative is a three column format. A first column would provide reference information such as the videodisc frame number of the corresponding visual along with a brief caption of the material. The main lesson narrative could be presented in a second middle column in which, for example, vocabulary terms could be capitalized and printed in bold face. Along with the narrative, it is possible to present symbols prompting the instructor in the operation of the videodisc player. For example, at the end of each narrative, the instructor could be instructed to press the STEP button to advance to the next video frame, press the MULTI button to show a move clip in slow motion, or press the PLAY button to show a movie clip at normal speed. It is, of course, possible to embed questions and answers within the narrative to assist in information conveyance. The third column in the Video Lesson Narrative can be reserved for notes, or other alternatives such as, for example, presentation of a frame number to identify the frame at which a vocabulary term being used can be found in the Illustrated Glossary.

The Activity Masters section is provided for photocopying and distribution to the students and is designed to develop student thinking skills and reinforce vocabulary. It is intended that the Activity function be incorporated as part of the video lesson, for example, asking a student to perform a particular illustrative activity during the video lesson or, alternatively, presenting the activity material to the student upon completion of the video lesson as a review and testing vehicle.

The last portion of the printed materials is a Print Directory, which lists the chapter and frame number for every slide and movie clip stored on the videodisc, along with a brief description. Utilization of the Print Directory permits the instructor to randomly access any portion of the videodisc at will to reinforce or review particular portions of the material being presented.

Figure 4A:
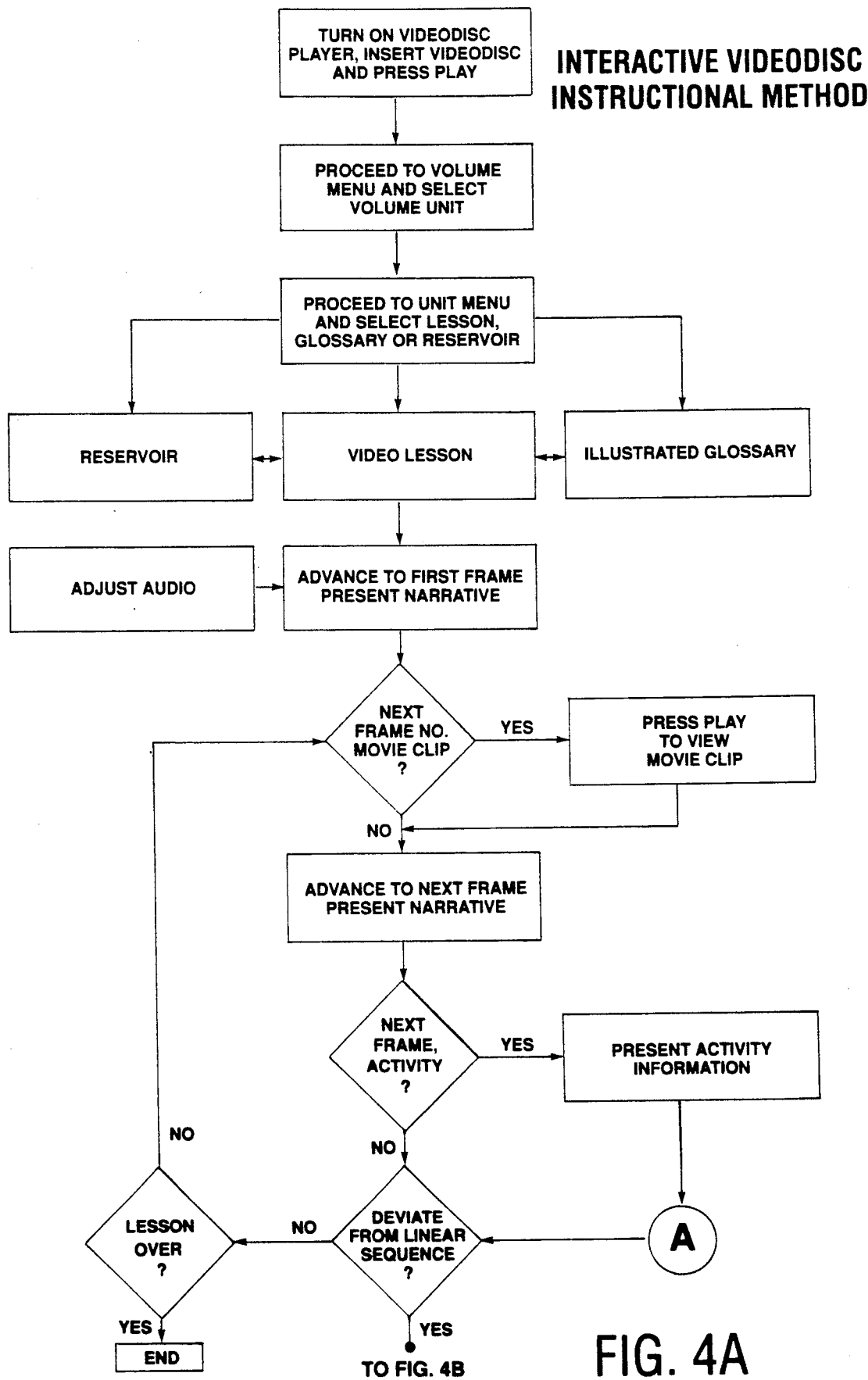
FIGS. 4A and 4B illustrate a flow chart describing the various steps which comprise the inventive method.
Figure 4B:
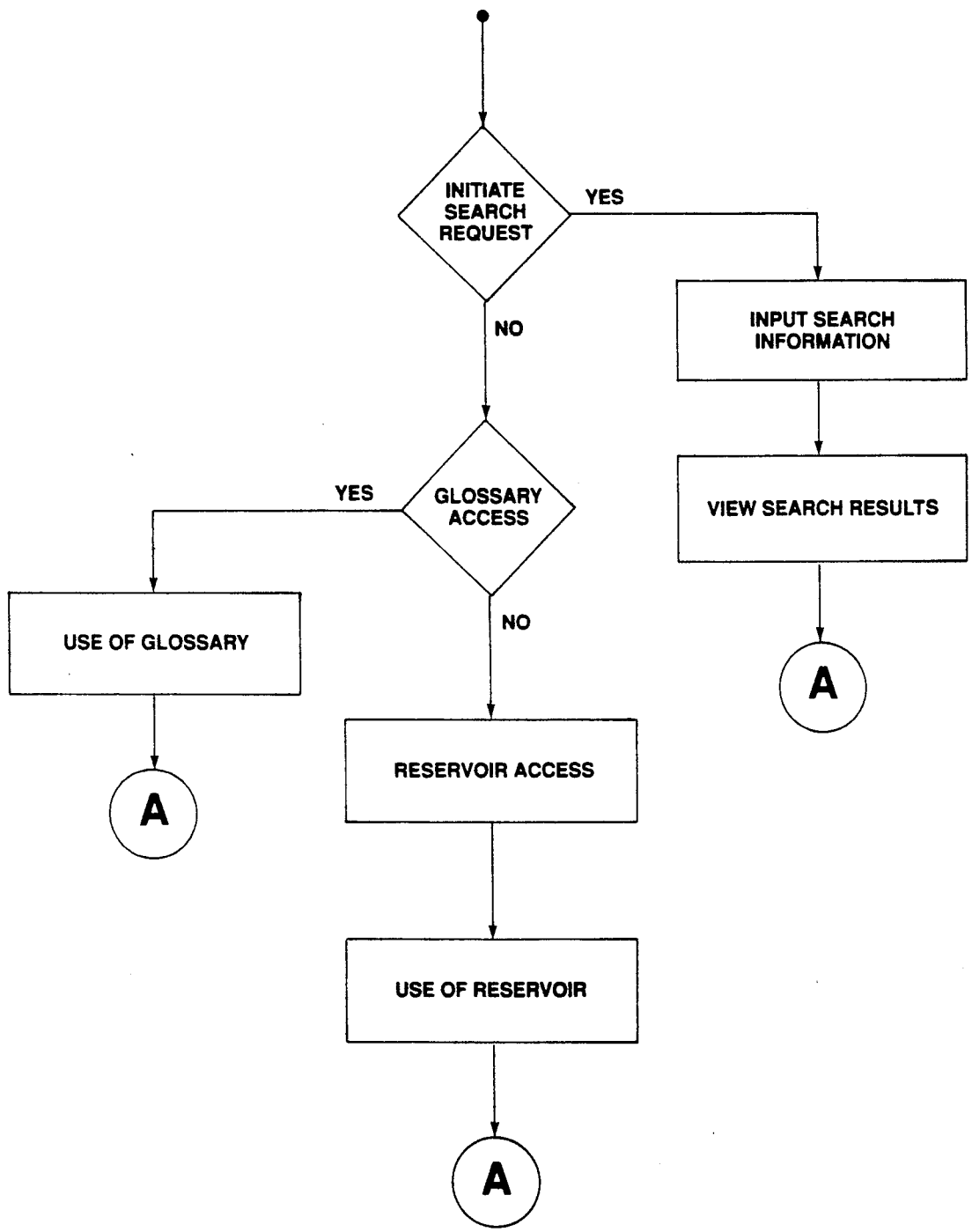

Referring now to FIGS. 4A and 4B, there is presented an exemplary flow chart describing use of the inventive, interactive, method for conveying information. More particularly, referring to FIG. 4A, block 10, an exemplary lesson is begun by turning on the videodisc player, inserting a videodisc and pressing PLAY. Thereafter, as shown in block 11, the instructor proceeds to a Volume Menu to select a particular Volume Unit for presentation to the students.

The instructor then proceeds to the Unit menu (block 12) and selects a particular Lesson, Glossary, or Reservoir portion for review. For example, the instructor could initially decide to proceed to block 13 and access the Illustrated Glossary, thereafter returning to the video lesson at block 14. Similarly, the instructor could proceed from block 12 to block 15 to access a Reservoir portion and, thereafter, return to the video lesson at block 14. It is, of course, understood that departure can be made from the video lesson sequence at any time by proceeding to the Reservoir or Illustrated Glossary, and thereafter returning to the same point in the video lesson sequence.

Assuming the decision is made to proceed with the video lesson, the instructor proceeds to block 16 and advances to the first frame in the video lesson plan, at which time the associated printed narrative would be presented. If is, of course, understood that it would also be necessary to adjust the volume level of the audio portion if separate audio is provided, as suggested in block 17.

As the video lesson proceeds, one possibility is that the next video frame will be a movie clip, as illustrated by decision block 18. In this instance, the instructor must press PLAY to view the movie clip (block 19). Upon completion of the movie clip, the teaching sequence returns for advancement to the next frame, along with presentation of the associated printed narrative (block 20).

Another decision possibility is the next video frame requiring an Activity for presentation to the students as illustrated in decision block 21. If the next frame consists of an Activity, the instructor proceeds to present the Activity information as illustrated at block 22 and, thereafter, returns to the normal linear sequence of the video lesson.

During the video lesson, it is possible that the instructor will decide at any time to deviate from the linear sequence (see decision block 23). Assuming as a first example that the decision is not to deviate from the linear sequence, the flow chart proceeds to decision block 24, where it is determined whether the lesson has been concluded. If, of course, the lesson is concluded, the lesson sequence ends (block 25). Alternatively, if the lesson is not over, the flow chart returns to block 18, at which time the sequence previously described is repeated.

Again, referring to block 23 in FIG. 4A, and assuming that the decision is made by the instructor to deviate from the linear lesson sequence, the flow chart then proceeds to FIG. 4B, block 25, where a decision is made as to whether lesson deviation is for initiation of a Search Request. If so, the flow chart proceeds to block 27, where search information (frame number) is presented to the videodisc player, via the remote control unit, and the search results are retrieved and displayed as illustrated in block 28. After reviewing the search results, the flow chart returns to point A in FIG. 4A, to continue with the lesson sequence.

If a search request is not required, the decision is then made as to whether deviation from the linear sequence was made to access the Glossary. This decision is made in block 29. If Glossary access is chosen, use of the Glossary proceeds in Block 30. Upon completion of Glossary use, the teaching sequence returns to point A in FIG. 4A.

Alternatively, if deviation from the linear lesson sequence was not chosen for Search purposes, or for Glossary access, then deviation has occurred to access the Reservoir, as illustrated in block 31. After access of the Reservoir, use of the Reservoir is illustrated in block 32, after which the lesson sequence returns to point A, for continuation of the lesson in accordance with the flow chart.

It is to be understood that the inventive method described above can be performed manually in conjunction with a videodisc player, and video monitor, or alternatively manual operation could be assisted with a properly programmed digital computer.

What has been described is an interactive, instructional method, which makes use of videodisc technology to effectively and efficiently convey information. The advantages of the inventive method are the ability to randomly access the videodisc, the unique arrangement of the accompanying printed material, the use of the video images to greatly enhance the oral presentation, the interactive nature of the process, which encourages student participation, the fact that student learning is not limited by student reading ability, and the formation of a trilogue configuration between the instructor, the student body and the video storage and display apparatus.

Through use of the instant invention, it has been determined that the need for formal textbooks has been essentially eliminated while, at the same time, the conveyance of information to the student body has been greatly enhanced.

Although specific embodiments of the invention have been shown and described, it will be understood that various modifications may be made without departing from the spirit of this invention.

We claim:

1. An educational method for conveying information from a teacher to a student via the interaction of the teacher, the student and a video display system, comprising the steps of:
   (a) activating a video storage device in which is stored a predetermined first portion of the information to be conveyed in a video format, the first portion comprising a plurality of video frames;
   (b) the teacher choosing a particular segment of the information to be conveyed in a video format in response to information requests from the student, by selectively accessing predetermined frames of the video format information for display on a video monitor;
   (c) the teacher presenting an oral narrative of a second portion of the information to be conveyed in conjunction with accessing and displaying frames of video information; and
   (d) modifying the step of selective access of predetermined frames of the video format information in response to information requests from the student.

2. A method of claim 1 further comprising the step of introducing activity requirements for the student, the cavity requirements being correlated to selected frames of the video format information.

3. A method of claim 2 further comprising the steps of initiating a search for specific information on the video storage device compiling and applying to the video storage device a predetermined address at which the specific information is stored, and displaying the specific information on the video monitor.

4. A method of claim 3 further comprising the step of requesting access to a predetermined glossary of terminology stored in the video storage device, accessing the glossary and displaying the accessed glossary terms on the video monitor.

5. A method of claim 4 further comprising the step of requesting access to a predetermined reservoir of associated information stored in the video storage device, accessing the reservoir of associated information, and displaying selected segments of the associated information on the video monitor.

* * * * *